United States Patent Office 3,185,723
Patented May 25, 1965

3,185,723
O-ALKYL, S, 1-PHENYL-2-ALKOXYCARBONYL-ETHYL ALKYLPHOSPHONOTHIOATES
Arthur John Floyd, Bracknell, England, assignor to Imperial Chemical Industries Limited, London, England, a corporation of Great Britain
No Drawing. Filed July 30, 1962, Ser. No. 213,093
Claims priority, application Great Britain, Aug. 3, 1961, 28,246/61
10 Claims. (Cl. 260—461)

This invention relates to new organo-phosphorus compounds, to processes for their preparation and to pesticidal compositions containing them.

The invention provides as new organo-phosphorus compounds having pesticidal properties, O-alkyl, S, 1-phenyl-2-alkoxycarbonylethyl alkylphosphonothioates, for example, compounds of the formula:

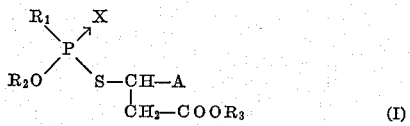
(I)

where $R_1$ is an aliphatic radical having 1–4 carbon atoms; $R_2$ is an aliphatic radical having 1–6 carbon atoms; $R_3$ is a hydrogen atom or an alkyl radical having 1–4 carbon atoms; A is a phenyl radical; and X is oxygen or sulphur. Compounds of particular interest are those in which the groups $R_1$ and $R_2$ are methyl or ethyl radicals, $R_3$ is a methyl radical and A is an unsubstituted phenyl radical or a phenyl radical having as substituent a halogen atom, or an alkyl or alkoxy radical of 1–4 carbon atoms.

The invention also provides pesticidal compositions comprising as active ingredient an organo-phosphorus compound of the invention and a carrier or diluent for the active ingredient. The pesticidal compositions can, for example, be liquid compositions in which the active ingredient is dissolved or dispersed in water or a suitably non-phytotoxic organic liquid. The compounds of the invention are, in general, only slightly soluble in water, but they are readily soluble in some aliphatic organic liquids for instance methanol, and in some aromatic liquids for instance benzene and methyl-substituted benzenes. Aqueous dispersions of a compound of the invention can be obtained by dissolving the compound in a small quantity of a suitable organic solvent which is immiscible with water and then dispersing the resulting solution in water, preferably with the aid of a dispersing agent.

Pesticidal compositions of the invention can be in the form of powders in which the active ingredient is in admixture with a powder diluent. The pesticidal compositions, whether liquid or powder, can contain a wetting or dispersing agent to facilitate their use as spray compositions, or can contain other substances useful in the formulation of pesticidal compositions, for example binders, stickers, corrosion inhibitors or stabilizing agents.

The compounds of the invention can be prepared by a process in which an alkyl ester of a β-halo-β-phenylpropionic acid is reacted with an ammonium or alkali metal salt of the appropriate O-alkyl, alkylphosphonothioic acid. For example, compounds of the structural Formula I above can be obtained by a process in which a compound of the formula:

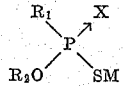

is reacted with a compound of the formula:

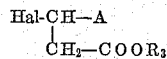

where $R_1$, $R_2$, $R_3$, X and A have the meanings given to them above; M is an atom of an alkali metal or ammonium; and Hal is an atom of a halogen, for example chlorine or bromine. The reaction can be conveniently performed using a solution of the reactants in water or in a suitable organic solvent. Organic solvents which have been found to be suitable are lower alkanols (for example methanol or ethanol), acetone or dioxane. The temperature required for the reaction naturally depends to a large extent upon the reactivity of the reactants; generally it is preferable to heat the reactants together to ensure satisfactory reaction. Where the process is carried out with the reactants in solution, it is convenient to heat the solution of the reactants under reflux to a temperature between 20 C. and the boiling point of the solution.

Those compounds of the invention which are dithioates can also be prepared by a second process in which an alkyl ester of the appropriate cinnamic acid is reacted with the appropriate O-alkyl, alkylphosphonodithioic acid. For example compounds of the structural Formula I above where X is sulphur can be obtained by reaction of a compound of the formula:

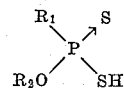

with a cinnamic ester of the formula:

$$A—CH=CH—COOR_3$$

where $R_1$, $R_2$, $R_3$ and A have the meanings given to them above. This second process is preferably carried out using as catalyst a small proportion of a base. This base can be an organic base, for example piperidine or pyridine, or an inorganic base, for example an alkali metal hydroxide or carbonate. It is advantageous to use a small proportion of an antioxidant, for example hydroquinone, to inhibit or at least retard accidental decomposition of the unsaturated ester. This second process can be performed using a mixture of the reactants in an inert diluent or, preferably, using a simple mixture of the reactants. Suitable diluents are certain hydrocarbon solvents, for example, benzene or toluene, and lower alkanols, for example methanol or ethanol. The temperature at which this process is performed is preferably in the range from 15° C. to 150° C. and especially from 50° C. to 100° C.

The invention also consists in a method of combating an insect pest, in which the pest is treated with an organo-phosphorus compound of the invention or a pesticidal composition containing it.

The invention is illustrated by the following examples in which (unless otherwise stated) the parts referred to are parts by weight.

*Example 1*

This example describes the preparation of O-methyl, S, 1-phenyl-2-methoxycarbonylethyl methylphosphonodithioate.

O-methyl methylphosphonodithioic acid (2.84 g.), methyl cinnamate (3.07 g.), 2 drops of piperidine, and a few crystals of hydroquinone were mixed together and the mixture was maintained at a temperature in the range 50–60° C. for 9 days. The mixture was then extracted with benzene (100 ml.) and the resulting benzene solution was washed with two successive 25 ml. portions of 10% aqueous sodium bicarbonate solution, then with water (25 ml.), dried over anhydrous magnesium sulphate, and the benzene was then removed by distillation in vacuo. The resultant oil was distilled to a pot temperature of 110° C. under a pressure of 0.02 mm. mercury and the residue remaining as a yellow undistillable oil was crude O-methyl, S, 1-phenyl-2-methoxy-carbonylethyl methylphosphonodithioate which has been characterised by means of its infra-red spectrum. This crude product has been purified by means of chromatography using silica gel as support and the fractions of purified product obtained have been found to have refractive indices (at 22° C.) in the range from 1.565 to 1.567.

*Examples 2–5*

Several other O-methyl, S, phenyl-2-methoxycarbonylethyl methylphosphonodithioates have been prepared by the general process of Example 1, but using various substituted methyl cinnamates instead of methyl cinnamate itself. The products thus obtained, which are set out as examples 2–5 in the table below, are all believed to have structures corresponding to the formula:

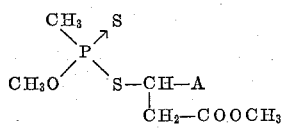

where A is a substituted phenyl radical, and the products are identified in the table simply by reference to the value of the group A. For the sake of convenience the double bonds have been omitted from all the benzene rings depicted in the table.

| Example No. | A | Physical constants of the product |
|---|---|---|
| 2 | —⟨⟩—Cl | |
| 3 | —⟨⟩ with Cl | $n_D^{22}$, 1.577 |
| 4 | —⟨⟩—OCH₃ | $n_D^{22}$, 1.574 |
| 5 | —⟨⟩ with Cl Cl | $n_D^{22}$, 1.589 |

The products of Examples 1–5 above have been found to be active when applied as 0.05% strength aqueous emulsions (i.e. 500 p.p.m.) against the caterpillar *Plutella maculipennis*.

What I claim is:

1. A compound having the formula:

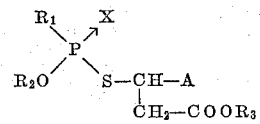

where:
R is alkyl having 1–4 carbon atoms;
R₂ is alkyl having 1–6 carbon atoms;
R₃ is selected from the group consisting of hydrogen and alkyl having 1–4 carbon atoms;
A is selected from the group consisting of phenyl, halophenyl, alkoxyphenyl and alkylphenyl wherein the alkoxy and alkyl substituents include from 1–4 carbon atoms; and
X is selected from the group consisting of oxygen and sulphur.

2. A compound according to claim 1 wherein R₃ is alkyl having 1–4 carbon atoms, A is phenyl and X is sulphur.

3. A compound according to claim 1 wherein R₃ is alkyl having 1–4 carbon atoms, A is phenyl and X is oxygen.

4. A compound according to claim 1 wherein R₃ is alkyl having 1–4 carbon atoms, A is halophenyl and X is sulphur.

5. A compound according to claim 1 wherein R₃ is alkyl having 1–4 carbon atoms, A is halophenyl and X is oxygen.

6. A compound according to claim 1 wherein R₃ is alkyl having 1–4 carbon atoms, A is alkylphenyl wherein the alkyl contains 1–4 carbon atoms and X is sulphur.

7. A compound according to claim 1 wherein R₃ is alkyl having 1–4 carbon atoms, A is alkylphenyl wherein the alkyl contains 1–4 carbon atoms and X is oxygen.

8. A compound according to claim 1 wherein R₃ is alkyl having 1–4 carbon atoms, A is alkoxyphenyl wherein the alkoxy contains 1–4 carbon atoms and X is sulphur.

9. A compound according to claim 1 wherein R₃ is alkyl having 1–4 carbon atoms, A is alkoxyphenyl wherein the alkoxy contains 1–4 carbon atoms and X is oxygen.

10. The compound O-methyl, S, 1-phenyl-2-methoxycarbonylethyl methylphosphonodithioate.

References Cited by the Examiner

UNITED STATES PATENTS

| | | | |
|---|---|---|---|
| 2,578,652 | 12/51 | Cassaday | 260—461 |
| 2,769,743 | 11/56 | Mattson | 167—30 |
| 2,802,856 | 8/57 | Norman et al. | 260—461 |
| 2,881,201 | 4/60 | Schrader | 260—461 |
| 2,947,662 | 8/60 | Fusco | 260—461 |
| 2,954,318 | 9/60 | Ludvik | 167—30 |
| 2,976,308 | 3/61 | Bacon | 260—461 |
| 3,065,256 | 11/62 | Schrader | 260—461 |
| 3,074,991 | 1/63 | Schrader | 260—461 |
| 3,076,009 | 1/63 | Schrader et al. | 260—461 |

FOREIGN PATENTS 1,011,416   7/57   Germany.

OTHER REFERENCES

Mel'nikov et al.: "Chem. Abst.," vol. 48, columns 556–557 (1954).

CHARLES B. PARKER, *Primary Examiner.*

MORRIS LIEBMAN, IRVING MARCUS, *Examiners.*